United States Patent
Peterson et al.

(10) Patent No.: US 7,823,803 B2
(45) Date of Patent: Nov. 2, 2010

(54) INTEGRATED BREAKAWAY CYLINDER AND METHOD FOR CONSTRUCTING A BOOM ASSEMBLY

(75) Inventors: John Peterson, Jackson, MN (US);
Kevin Mcilravy, Jackson, MN (US);
Paul Hitzemann, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 11/842,767

(22) Filed: Aug. 21, 2007

(65) Prior Publication Data

US 2009/0049692 A1 Feb. 26, 2009

(51) Int. Cl.
*B05B 1/20* (2006.01)
*B05B 3/14* (2006.01)
*F01B 7/20* (2006.01)
*F15B 15/16* (2006.01)
*F16D 31/02* (2006.01)

(52) U.S. Cl. ............... 239/166; 239/159; 239/161; 239/163; 239/167; 239/172; 92/51; 92/52; 92/53; 91/167 R; 91/169; 60/469

(58) Field of Classification Search ............... 239/159, 239/161, 163, 166, 167, 172; 92/52, 51, 92/53; 91/169, 196, 206–209, 167 R; 60/469
See application file for complete search history.

(56) References Cited

U.S. PATENT DOCUMENTS

| | | | | |
|---|---|---|---|---|
| 3,956,970 | A * | 5/1976 | Kupiek et al. | 91/173 |
| 4,852,464 | A * | 8/1989 | Bartmann et al. | 92/53 |
| 5,755,382 | A | 5/1998 | Skotinkov | |
| 6,029,559 | A * | 2/2000 | Barthalow et al. | 91/167 R |
| 6,119,963 | A | 9/2000 | Bastin et al. | |
| 6,360,857 | B1 * | 3/2002 | Fox et al. | 188/281 |
| 6,776,356 | B2 * | 8/2004 | Maliteare | 239/163 |
| 6,789,746 | B2 | 9/2004 | Guesdon | |
| 7,063,273 | B2 * | 6/2006 | Hahn et al. | 239/159 |
| 2005/0184175 | A1 * | 8/2005 | Wubben et al. | 239/722 |

OTHER PUBLICATIONS

International Search Report and Written Opinion from corresponding PCT Application No. PCT/US2008/073310 (dated Mar. 20, 2009).

\* cited by examiner

*Primary Examiner*—Len Tran
*Assistant Examiner*—Justin Jonaitis
(74) *Attorney, Agent, or Firm*—Hovey Williams LLP

(57) ABSTRACT

An integrated breakaway cylinder for controlling a boom of a self-propelled sprayer and method for constructing a boom assembly is disclosed in the present application. The integrated breakaway cylinder is constructed from a first stage cylinder and a second stage cylinder. The first stage cylinder is configured in a rod and barrel arrangement. The second stage cylinder is also configured in a rod and barrel arrangement, with the barrel of the first stage cylinder serving as the rod of the second stage cylinder. The first stage cylinder operates to extend and retract a boom. The second stage cylinder operates to absorb shock from inertia or the boom impacting an object. The design of various embodiments of the present invention couples the operation of maneuvering a boom with shock absorption into a single integrated cylinder.

13 Claims, 5 Drawing Sheets

INTEGRATED BREAKAWAY CYLINDER AND METHOD FOR CONSTRUCTING A BOOM ASSEMBLY

BACKGROUND OF THE INVENTION

1. Technical Field

The present invention relates generally to a hydraulic cylinder used to control the position of a sprayer boom.

2. Description of Related Art

The high crop yields of modern agribusiness require large amounts of fertilizers, pesticides, and herbicides. Dispersing these chemicals onto high acreage fields requires specialized machines. A ubiquitous example of such a machine is the self-propelled sprayer.

As illustrated in FIG. 1, a common design for a self-propelled sprayer includes a dedicated chassis 1 with a tank 20, booms 30, and nozzles 40 connected to the booms 30. The tank 20 contains fluid such as fertilizers, pesticides, and herbicides. Booms 30 extend outward from the sides of the dedicated chassis 1. Boom plumbing runs along the length of the booms 30, and contains a plurality of nozzles spaced apart along the length of the booms 30.

In operation, as the dedicated chassis 1 crosses a field, fluid is pumped from the tank 20 to the sprayers 40 along the booms 30, and out through the nozzles. This allows the self-propelled sprayer to distribute the fluid along a relatively wide path. The length of conventional booms 30 may vary from, for example 6 meters (18 feet) up to 46 meters (150 feet). It is not practical for the booms 30 of the self-propelled sprayer to always be in the extended position. This would make it difficult to store, maneuver or transport the self-propelled sprayer around buildings and on the road. Therefore, the booms 30 are designed to swing or fold into a more compact position.

Movement of the booms 30 is accomplished using hydraulic cylinders. By regulating fluid pressure within the cylinders, the boom can be easily moved. When the self-propelled sprayer is operating, the booms 30 are extended.

The relatively large width of path covered by a self-propelled sprayer makes accidental contact between the booms and external objects inevitable. When a boom 30 impacts an object such as a tree, the ground, a power pole, or a rock, extensive damage can occur if the boom 30 is held rigid.

To address the problem of collisions between the boom and other objects, breakaway cylinders have been employed. FIG. 2 illustrates one conventional design of a boom frame assembly 50, having a breakaway cylinder 70 separate from main swing cylinders 60a, 60b. The main swing cylinders 60a, 60b are attached to the boom frame 55 to regulate the position of the booms. Each of the two main cylinders 60a, 60b is employed to regulate one of the booms. The breakaway cylinder 70 is coupled to the main swing cylinders 60. Unlike the main swing cylinders 60, the breakaway cylinder 70 is adapted to be independently controlled, allowing for the breakaway cylinder 70 to compress. Thus, the force from the boom striking an object causes breakaway cylinder 70 to compress, which enables the boom to swing rearward. This lessens the impact from the collision and reduces or minimizes damage to the boom.

It would be beneficial to reduce the number of separate cylinders that are required in a boom assembly and increase distance that the breakaway cylinder is able to compress to improve impact absorption.

BRIEF SUMMARY OF THE INVENTION

The present invention provides an integrated breakaway cylinder for use in maneuvering a boom of a self-propelled sprayer. In essence, the integrated breakaway cylinder combines into a single structure the main swing cylinder used for maneuvering a boom with a breakaway cylinder used for absorbing impacts.

An exemplary embodiment of the present integrated breakaway cylinder comprises a first stage cylinder and a second stage cylinder. The first stage cylinder preferably comprises a rod and first barrel. The first barrel comprises a base, a top, and a cylindrical wall. An external port is disposed on the cylindrical wall near the top of the first barrel. The first barrel also comprises a base aperture disposed at the base of the first barrel. The rod is extended and retracted by injecting and evacuating hydraulic fluid through the external port and base aperture.

The second stage cylinder also comprises a rod and barrel arrangement. The second stage cylinder comprises a second stage barrel, which further comprises a base, a cylindrical wall, and a top. The first barrel of the first stage cylinder serves as the rod of the second stage cylinder. The base and portion of the cylindrical wall of the first barrel are inserted into the second barrel. The second barrel and the base of the first barrel define a chamber within the second stage cylinder. The second barrel further comprises a pressure regulation conduit in communication with a fluid pressure sensitive valve. As fluid pressure in the chamber of the second stage cylinder increases, the fluid pressure sensitive valve enables fluid to be evacuated to reduce fluid pressure.

In operation, the first stage cylinder is used to fold and extend a boom. During spraying, a constant position is maintained in the first stage cylinder. Relatively constant fluid pressure is maintained in the second stage cylinder. This maintains the boom in a rigid extended position during spraying and prevents the boom from swaying or swinging. If during spraying the boom collides with an object, however, the increase in fluid pressure in the second cylinder is quickly absorbed. This maintained fluid pressure allows the first stage barrel to retract into the second stage barrel. As a result, the impact is absorbed by enabling the boom to swing rearward.

These and other features as well as advantages, which characterize various exemplary embodiments of the present invention, will be apparent from a reading of the following detailed description and a review of the associated drawings.

DETAILED DESCRIPTION OF PREFERRED EMBODIMENTS

Figure 1:
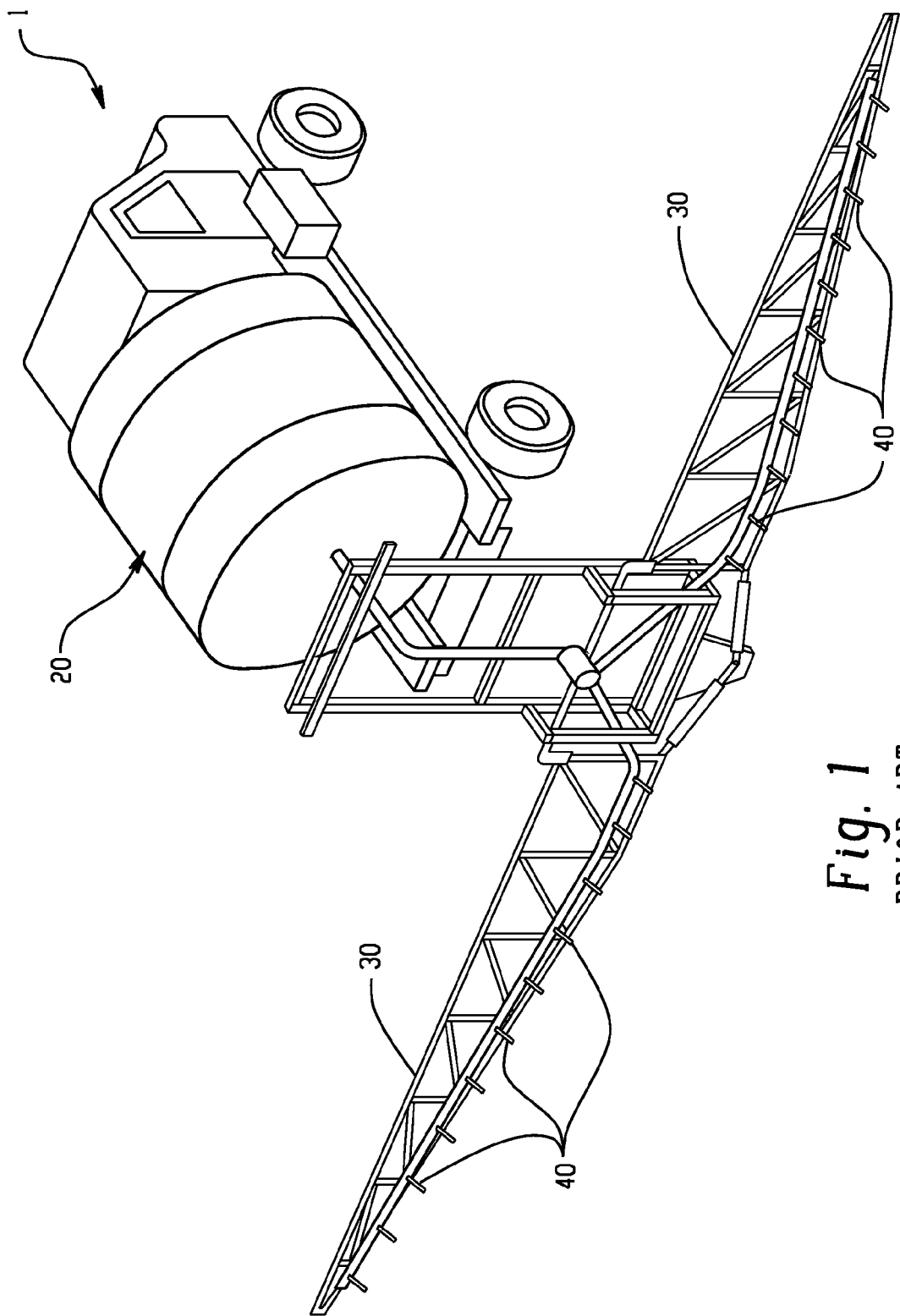
FIG. 1 illustrates a self-propelled sprayer of the prior art.
Figure 2:
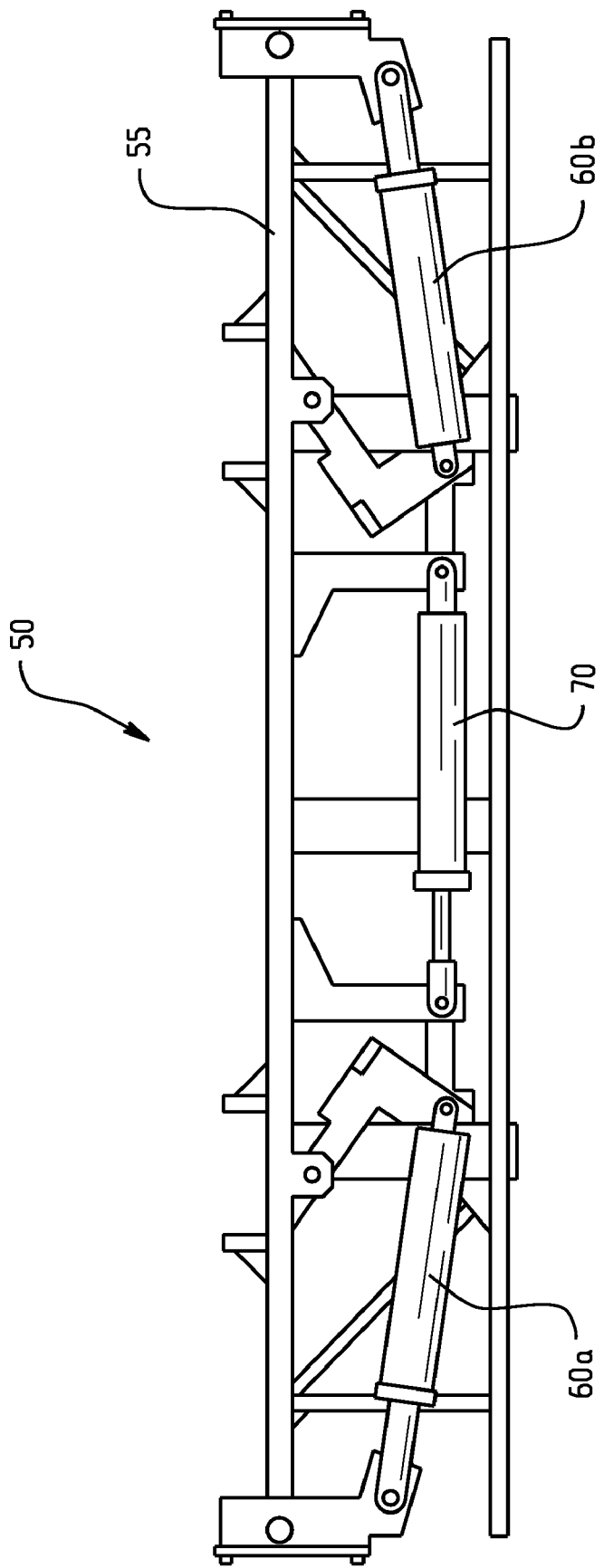
FIG. 2 illustrates a prior art design of main cylinders and a breakaway cylinder attached to a boom frame.
Figure 3:
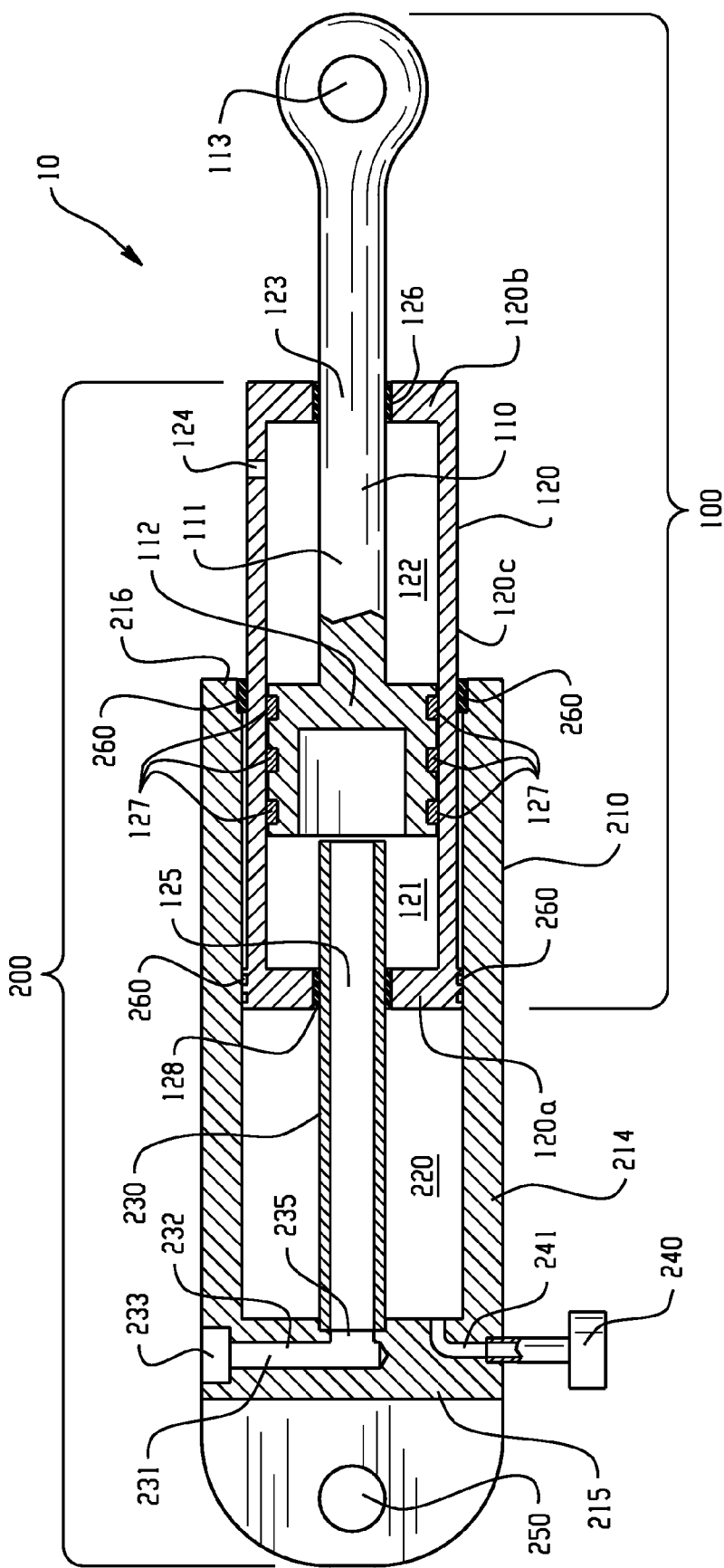
FIG. 3 illustrates an exemplary embodiment of an integrated breakaway cylinder.

Referring now in detail to the drawing figures, wherein like reference numerals represent like parts throughout the several views, FIG. 3 illustrates a cross-sectional view of an exemplary embodiment of the integrated break away cylinder 10. Integrated cylinder 10 comprises a first stage cylinder 100 and a second stage cylinder 200. The first stage cylinder 100 comprises a rod 110 and first stage barrel 120. The first stage barrel 120 comprises a first stage base 120a, a first stage top 120b, and a first stage cylindrical wall 120c. The second stage cylinder 200 also comprises a rod and barrel arrangement. The second stage cylinder 200 comprises a second stage barrel 210 and the first stage barrel 120 of the first stage cylinder 100, which functions as the rod in the second stage cylinder 200. The second stage barrel 210 further comprises a second stage cylindrical wall 214, a second stage base 215, and a second stage top 216.

The first and second stage cylinders 100, 200 define chambers that are preferably filled with hydraulic fluid. The fluid pressure of the hydraulic fluid enables the rod in each cylinder to move relative to the barrel. The first stage cylinder 100 is operable to maneuver the boom of a self-propelled sprayer. The second stage cylinder 200 is operable to absorb the shock of the boom from inertia or impacting an object.

In an exemplary embodiment, the first stage cylinder 100 comprises a cylindrical first stage barrel 120. The first stage barrel 120 is preferably constructed from metal such as steel, aluminum, or another suitable alloy or material. The first stage barrel 120 comprises a body preferably cylindrical and substantially hollow, having a cylindrical side wall 120c, a base 120a, and a top 120b. In other contemplated embodiments, the cross-section of the first stage barrel 120 may be a shape other than circular, such as elliptical, oblong, square, rectangular, polygonal, or another suitable shape. In such embodiments, other components of the integrated cylinder 10 would preferably have a functionally corresponding cross-section.

The base of the first stage barrel 120 comprises a base aperture 125. The base aperture 125 is preferably coaxial to the body of the first stage barrel 120. The cross-section of the base aperture 125 is preferably circular. In other contemplated embodiments, the cross-section of the base aperture 125 may be another shape as discussed above in relation to the cross-section of the first stage barrel 120.

The top of the barrel comprises a rod aperture 123. The rod aperture 123 is also preferably coaxial to the body of the first stage barrel 120. The cross-section of the rod aperture 123 is preferably circular. In other contemplated embodiments, the cross-section of the rod aperture 123 may be another shape as discussed above in relation to the cross-section of the first stage barrel 120. The first stage cylindrical wall 120c comprises an external port 124. The external port 124 is preferably axially transverse to the body of the first stage barrel 120.

The first stage cylinder 100 further comprises a rod 110. The rod 110 is preferably constructed from metal such as steel, aluminum, or another suitable alloy or material. The rod 110 comprises a shaft 111, a piston 112, and an upper attachment 113, which are all preferably integrally formed. In other contemplated embodiments, the shaft 111, a piston 112, and an upper attachment 113 may be formed of separate elements that are pivotally coupled, welded, or connected by other suitable means. The shaft 111 spans the interior and exterior of the first stage barrel 120 through the rod aperture 123. The cross-section of the shaft 111 is preferably circular. In other contemplated embodiments, the cross-section of the shaft 111 may be another shape as discussed above in relation to the cross-section of the first stage barrel 120. The diameter of the shaft 111 is preferably substantially equal to the diameter of the rod aperture 123. The end of the rod 110 disposed within the first stage barrel 120 comprises a piston 112. The cross-section of the piston 112 is preferably circular. In other contemplated embodiments, the cross-section of the piston 112 may be another shape as discussed above in relation to the cross-section of the first stage barrel 120. The diameter of the piston 112 is preferably substantial equal to the diameter of the interior of the first stage barrel 120. The piston 112 preferably divides the interior of the first stage barrel 120 into a lower chamber 121 and an upper 122.

The second stage cylinder 200 comprises a second stage barrel 210. The second stage barrel 210 preferably comprises a cylindrical and substantially hollow body, having a top 216, a cylindrical sidewall 214, and a base 215 disposed at the bottom of the body. The cross-section of the second stage barrel 210 is preferably circular. In other contemplated embodiments, the cross-section of the second stage barrel 210 may be another shape as discussed above in relation to the cross-section of the first stage barrel 120. The second stage barrel 210 is preferably constructed from metal such as steel, aluminum, or another suitable alloy or material. The second stage barrel 210 preferably partially defines a breakaway chamber 220. The second stage top 216 is preferably open with a diameter equal to the interior diameter of the breakaway chamber 220.

The second stage cylinder 200 further comprises the first stage barrel 120, which serves as a rod or piston in the second stage cylinder 200. The exterior diameter of the first stage barrel 120 is preferably equal to the interior diameter of the second stage barrel 210. In other contemplated embodiments, the first stage base 120a preferably has a greater diameter than the first stage cylindrical wall 120c. In such embodiments, the first stage base 120a is preferably equal in diameter to the interior diameter of the second stage wall 214. The first stage barrel 120 is preferably adapted to slide into the second stage barrel 210. The first stage barrel 120 and the second stage barrel 210 are preferably coaxially aligned. In this manner, the first stage barrel 120 and the second stage barrel 210 define the parameters of the breakaway chamber 220.

In other contemplated embodiments, the second stage top 216 may comprise an aperture. For example, the second stage top 216 may comprise an aperture similar to the rod aperture 123 at the top of the first stage barrel 120. The diameter of the aperture would be preferably substantially equal to the diameter of first stage cylindrical wall 120c. The interior diameter of the second stage barrel 210, which defines the breakaway chamber 220, would preferably be greater than the diameter of first stage base 120a and first stage cylindrical wall 120c. In such an embodiment, the first stage barrel 120 would be in contact with the second stage barrel 210 at the surface of the top aperture, and would not be in contact with the walls of the breakaway chamber 220.

The second stage cylinder 200 further comprises a base conduit 231. The base conduit 231 preferably spans the breakaway chamber 220 and the exterior of the second stage barrel 210 through the second stage base 215 of the second stage barrel 210. The base conduit 231 preferably comprises a first segment 232, which is coupled to a first port 233 at the side wall of the second stage base 215, axially transverse to the body of the second stage barrel 210. The first segment 232 preferably further comprises a second port 235, disposed within the second stage base 215.

The second stage cylinder 200 further comprises a center tube 230. The center tube 230 is preferably coaxially aligned with the body of the second stage barrel 210. The center tube 230 is preferably coupled to the second port 235 of the base conduit 231. The diameter of the center tube 230 is preferably substantially equal to the diameter of the base aperture 125 of the first stage barrel 120. The center tube 230 preferably spans the breakaway chamber 220 and the lower chamber 121, through the base aperture 125. The center tube 230 is preferably cylindrical and substantially hollow. The base conduit 231 and the center tube 230 preferably enable fluid communication between the first port 233 and the lower chamber 121.

To enable maneuvering and shock absorption of the boom, the integrated cylinder 10 is preferably mounted on a boom frame, attached to the self-propelled sprayer. The integrated cylinder 10 further comprises an upper attachment 113 and a lower attachment 250. The upper attachment 113 is preferably pivotally coupled to the boom of a self-propelled sprayer. The lower attachment 250 is preferably pivotally coupled to the boom frame or alternatively to a part of the self-propelled sprayer. In other contemplated embodiments, the integrated cylinder 10 may be connected in opposite fashion. For example, the upper attachment 113 may preferably be pivotally coupled to the boom frame or alternatively to a part of the self-propelled sprayer, and the lower attachment 250 may preferably be pivotally coupled to the boom of a self-propelled sprayer.

Figure 4:
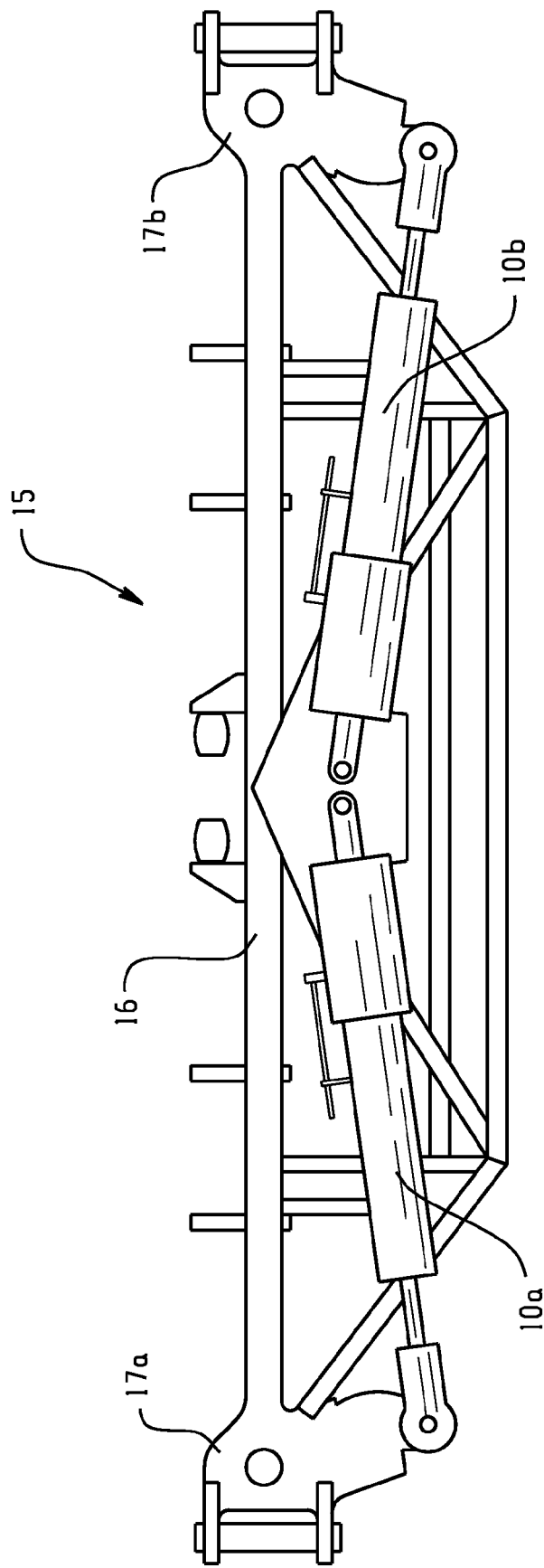
FIG. 4 illustrates an exemplary embodiment of an integrated breakaway cylinder connected to a boom frame.

A self-propelled sprayer comprises two booms, one extending from each side. Each boom preferably is associated to one integrated cylinder 10. FIG. 4 illustrates two integrated cylinders 10a, 10b mounted to a boom frame assembly 15, each preferably controlling one of the booms. The boom frame assembly 15 comprises a boom frame 16 and two pivotal mounting brackets 17a, 17b for pivotally coupling with one of the booms. The booms, boom frame 16, and pivotal mounting brackets 17a, 17b are preferably designed such that extension of the first stage cylinder 100 (depicted in FIG. 3) of one of the integrated cylinders 10a, 10b controls the folding and extension of one of the booms. Referring back to FIG. 3, as the rod 110 of the first stage cylinder 100 retracts into the first stage barrel 120, the boom is extended into the spraying position. Conversely, as the rod 110 extends out of the first stage barrel 120, the boom transitions into the folded position.

The first stage cylinder 100 operates by varying hydraulic fluid flow and pressure in the lower chamber 121 and upper chamber 122. The external port 124 enables fluid communication between the upper chamber 122 and a hydraulic pump (not shown). Likewise, the center tube 230 and base conduit 231 enable fluid communication between the lower chamber 121 and a hydraulic fluid pump.

The first stage cylinder 100 further preferably comprises one or more rod seals 126 disposed between the rod aperture 123 and shaft 111. The rod seal 126 is preferably rubber or another suitable material. The rod seal 126 prevents hydraulic fluid from leaking between the rod aperture 123 and shaft 111. The coefficient of friction of the rod seal 126 is preferably low to enable the shaft 111 to easily glide through the rod aperture 123. In other contemplated embodiments, the rod seal 126 may be smoothed or lubricated. The rod seal 126 is preferably attached to the rod aperture 123 by an adhesive or other bonding agent. In other contemplated embodiments, the rod seal 126 may be integrally formed with the rod aperture 123, fit within a slot, or fit over the edge of the rod aperture 123.

The first stage cylinder 100 further preferably comprises one of more center tube seals 128 disposed between the center tube 230 and the base aperture 125. The center tube seals 128 are preferably similar in material and design to the rod seal 126. The center tube seal 128 is designed to prevent fluid from passing between the breakaway chamber 220 and the lower chamber 121. The center tube seal 128 must enable the center tube 230 to easily glide through the base aperture 125, between the breakaway chamber 220 and the lower chamber 121.

The first stage cylinder 100 further preferably comprises one or more rings 127 disposed between the piston 112 and the interior of the first stage barrel 120. The ring 127 is preferably circumferencially disposed around the piston 112. The ring 127 is preferably formed from metal such as aluminum. In other contemplated embodiments, the ring may be formed from plastic, rubber, or another metal, alloy, or suitably material. The ring 127 is preferably fitted into a slot or groove on the piston 112. The ring 127 is preferably fitted to abut against the interior wall of the first stage barrel 120. The ring 127 prevents hydraulic fluid from passing between the upper chamber 122 and the lower chamber 121 during operation of the first stage cylinder 100. The coefficient of friction of the ring 127 is preferably low so the piston 112 can easily glide inside of the first stage cylinder 120. If the ring 127 is misaligned, not properly positioned, or fitted to tightly, friction and wear would be increased between the piston 112 and first stage barrel 120, compromising the structure and function of the integrated cylinder 10.

Fluid pressure in the upper chamber 122 is increased by injecting hydraulic fluid from the pump into the upper chamber 122 through the external port 124. As the fluid pressure in the upper chamber 122 increases, the piston 112 is forced toward the base of the first stage barrel 120. This causes the fluid pressure in the lower chamber 121 to increase. As the fluid pressure in the lower chamber 121 increases, fluid is evacuated through the center tube 230 and the base conduit 231. As the piston 112 moves down along the interior of the first stage barrel 120, the shaft 111 slides through the rod aperture 123 into the first stage barrel 120. As the shaft 111 retracts, force is exerted upon the upper attachment 113, which pulls the boom out into an extended spraying position.

The boom is returned to the folded position by reversing the operation described above. Fluid pressure in the lower chamber 121 is increased by injecting hydraulic fluid from the pump through the base conduit 231 and the center tube 230. As the fluid pressure increases, the piston 112 is pushed toward the top of the first stage barrel 120. Movement of the piston 112 causes the fluid pressure in the upper chamber 122 to increase. As the fluid pressure increases, fluid is evacuated through the external port 124. Movement of the piston 112 causes the shaft 111 to slide through the rod aperture 123 out of the first stage barrel 120. As the shaft 111 extends out of the first stage barrel 120, force is exerted upon the upper attachment 113, which pushes the boom back into a folded position.

The breakaway or shock absorption feature of the integrated cylinder 10 is enabled by the second stage cylinder 200. During operation of the self-propelled sprayer, the fluid flow in the lower and upper chambers 121, 122 is restricted so that the boom remains in the extended spraying position. The second stage cylinder 200 is preferably designed to enable fluid pressure in the breakaway chamber 220 to be controlled while the boom is extended.

During operation, should the boom impact an object or move due to inertia, force would be translated to the integrated cylinder 10. This force would be exerted upon the upper attachment 113 and be directed axially along the body of the integrated cylinder 10 toward the lower attachment 250. The force would compress the fluid within the breakaway chamber 220. This compression would increase fluid pressure in the breakaway chamber 220. This increased fluid pressure could potentially damage the integrated cylinder 10 or cause the boom to bend or break, since it is maintained in a rigid position by the integrated cylinder 10.

The second stage cylinder 200 further comprises a pressure regulation conduit 241 and a fluid pressure responsive valve 240. As the fluid pressure in the breakaway chamber 220 increases, the fluid pressure responsive valve 240 opens, allowing fluid to evacuate out of the breakaway chamber 220 through the pressure regulation conduit 241. As the fluid evacuates, the first stage barrel 120 slides into the body of the second stage barrel 210 and over the center tube 230. The second stage cylinder 200 further preferably comprises on or more seals or rings 260 disposed between the first stage barrel 120 and second stage barrel 210. The seals of rings 260 are preferably structurally similar to seals 126, 128 and rings 127. The seals or rings 260 preferably remain in contact with the first stage barrel 120 and second stage barrel 210 throughout the full range of motion of the second stage cylinder 200.

As the first stage barrel 120 slides into the second stage barrel 210, the boom pivots rearward toward the rear of the self-propelled sprayer to lessen the impact. As the force on the boom is abated, the fluid pressure in the breakaway chamber 220 decrease. Once the fluid pressure decreases below a certain level, hydraulic fluid is supplied through the fluid pressure sensitive valve 240 and pressure regulation conduit 241 into the breakaway chamber 220 until fluid pressure is restored to a predetermined level. This causes the first stage barrel 120 to extend out of the second stage barrel 210, returning the boom to the extended, pre-impact, spraying position.

In this manner, the second stage cylinder 200 serves the function of a hydraulic spring. The controlled hydraulic fluid pressure in the breakaway chamber allows the second stage cylinder 200 to compress and rebound as the boom impacts an object. This allows the boom to pivot rearward to lessen the impact, and return to its extended spraying position once the object has been passed. The integrated nature of the cylinder combines the movement control of the boom with shock absorption into a single cylinder assembly.

Figure 5:
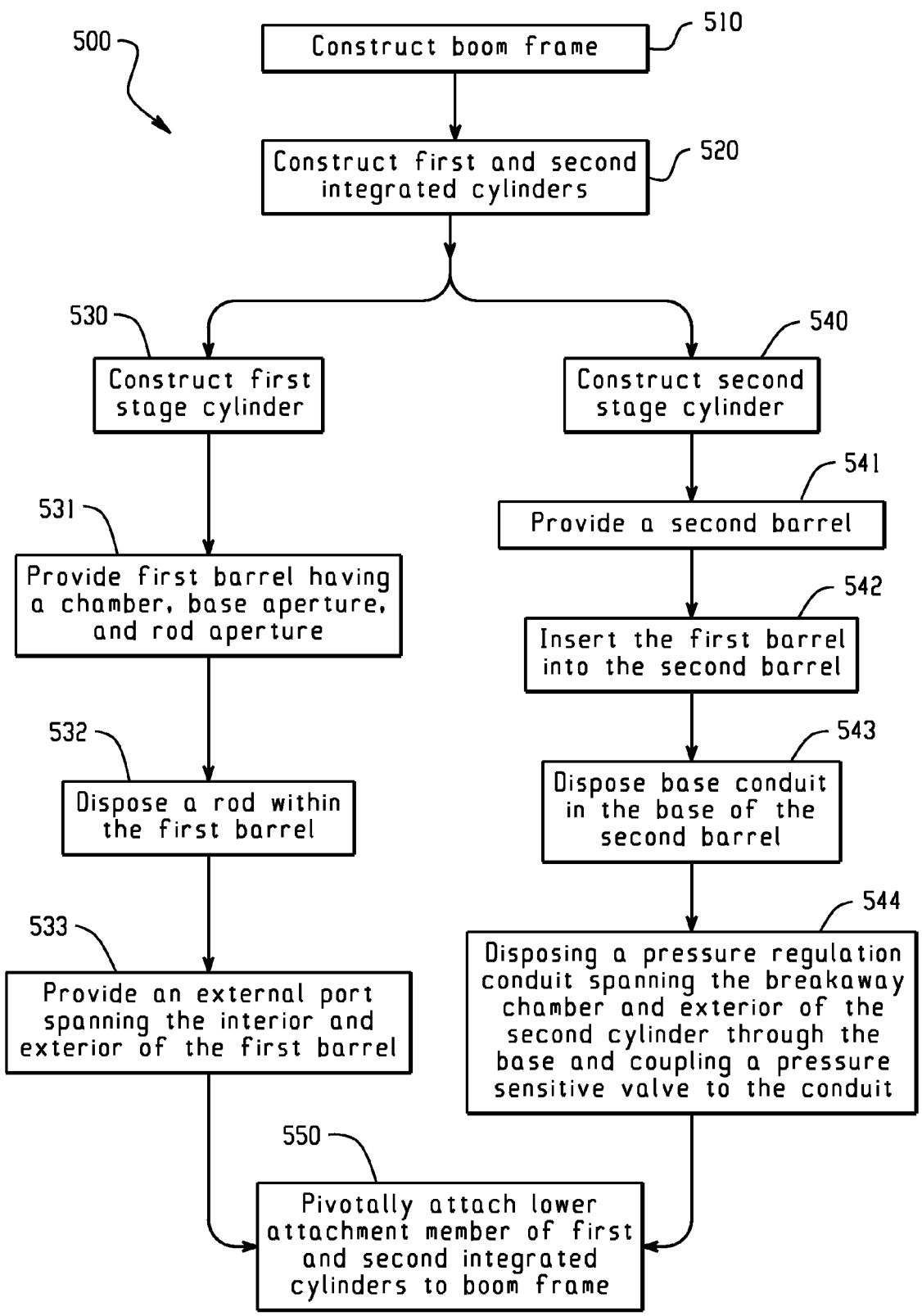
FIG. 5 is a schematic of a preferred process of the present invention.

FIG. 5 illustrates a method for constructing the boom assembly 500. Construction of the boom assembly begins with constructing a boom frame 510. The boom frame is preferably constructed from a lattice of metal bars or beams welded into a support structure. In other contemplated embodiments, the boom frame may be forged from a single piece of metal. The boom frame is preferably adapted to attach or mount to the back of a self-propelled sprayer. Next a first and second integrated cylinder 520 is constructed. Constructing the integrated cylinders 520 further comprises constructing a first stage cylinder 530 and a second stage cylinder 540.

Constructing the first stage cylinder 530 further comprises providing a cylindrical first barrel having a hollow cylindrical chamber, and a base aperture and a rod aperture 531. The cylindrical chamber, base aperture, and the rod aperture are preferably coaxial to the body of the first barrel. Constructing the first stage cylinder 530 further comprises the step of disposing a rod within the first barrel 532. The rod preferably comprises a shaft and a piston. The shaft of the rod preferably spans the interior and exterior of the first barrel through the rod aperture. Constructing the first stage cylinder 530 further comprises providing an external port spanning the interior and exterior of the first barrel 533. The external port preferably enables fluid communication between the interior and exterior of the first barrel.

Constructing the second stage cylinder 540 further comprises providing a second barrel 541. The second barrel is preferably cylindrical with a hollow cylindrical chamber coaxial to the body of the second barrel. The second barrel further preferably comprises a center tube in communication with the base of the second barrel and coaxial to the second barrel. Constructing the second stage cylinder 540 further comprises inserting the first barrel into the second barrel such that the center tub passes through the base aperture of the first barrel 542.

Constructing the second stage cylinder 540 further comprises disposing a base conduit spanning the interior and exterior of the second barrel through the base of the second barrel 543. The conduit preferably comprises a first port located on the exterior of the base of the second stage barrel and a second port located within the base. The first port and second port are preferably spanned by a first segment enabling fluid communication between the ports. The second port is preferably coupled to the center tube.

Constructing the second stage cylinder 540 further comprises disposing a pressure sensitive valve on the exterior of the second barrel 544, enabling fluid communication between the interior and exterior of the barrel through a pressure regulation conduit. The pressure sensitive valve is preferably adapted to open, and enable bidirectional fluid communication between the exterior and interior of the second barrel.

Constructing the boom assembly 500 further comprises pivotally attaching a lower attachment member of the first and second integrated cylinders to the boom frame 550.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

What is claimed is:

1. A boom assembly for a self-propelled sprayer comprising:
   a boom frame including first and second pivotal mounting brackets adapted to couple with first and second swingable booms, respectively, such that pivoting of each bracket corresponds with swinging of an associated one of the booms; and
   first and second integrated cylinders, each of the first and second cylinders including a lower attachment pivotally connected to the boom frame and an upper attachment pivotally connected to a respective one of the mounting brackets so that overall extension and retraction of the integrated cylinder pivots the respective mounting bracket in a manner configured to correspond with folding and extension of the associated boom,
   each of said cylinders including a first stage cylinder and a second stage cylinder that define respective first and second fluid chambers,
   said first stage cylinder including a piston reciprocally disposed within the first fluid chamber and operably coupled between the attachments so that fluid flow into and out of the first fluid chamber causes reciprocation of the piston to adjust the overall length of the integrated cylinder and thereby pivot the respective mounting bracket to a desired position, said second stage cylinder being configured to releasably maintain a volume of fluid within the second fluid chamber, whereby the respective mounting bracket is removably retained in the desired position, and to permit fluid to flow from the second chamber when the pressure within the second fluid chamber exceeds a predetermined pressure level, whereby the pressure is relieved and the respective mounting bracket is permitted to pivot away from the desired position, said first and second fluid chambers being fluidly isolated from one another so that fluid from one chamber is prevented from passing into the other chamber, said volume of fluid within the second fluid chamber being undisturbed by reciprocation of the piston within the first fluid chamber.

2. The boom assembly of claim 1, said first stage cylinder having a first barrel including a cylindrical side wall, a base portion, a top portion, and a base aperture disposed in the base portion, the first stage cylinder further having a rod carrying the piston, said second stage cylinder having a second barrel including a cylindrical side wall, a base portion, and a top portion, the second stage cylinder further having a center tube;

wherein the center tube extends through the base aperture to intercommunicate the center tube and first fluid chamber.

3. The boom assembly of claim 2, said second fluid chamber defined by the second barrel and the base of first barrel, said first fluid chamber being divided by the piston into a lower chamber and an upper chamber, wherein the center tube spans the second fluid chamber and the lower chamber through the base aperture.

4. The boom assembly of claim 3, a base conduit spanning the base of the second barrel, the center tube in communication with the base conduit, a port in communication with the base conduit disposed on the exterior of the base of the second barrel, wherein the center tube and base conduit enable fluid communication between the port and the lower chamber.

5. The boom assembly of claim 4, each of the first and second integrated cylinders further comprising a pressure sensitive valve, adapted to open and enable fluid communication when the fluid pressure within the second fluid chamber exceeds the predetermined pressure level.

6. The boom assembly of claim 5, wherein each of the first and second integrated cylinders are adapted to compress as the pressure sensitive valve is opened and fluid is evacuated out of the second fluid chamber.

7. The boom assembly of claim 5, wherein each of the first and second integrated cylinders are adapted to enable fluid to enter the second fluid chamber through the pressure sensitive valve.

8. The boom assembly of claim 1, said first stage cylinder being shiftable relative to the second stage cylinder.

9. The boom assembly of claim 8, said first stage cylinder cooperating with the second stage cylinder to define the second fluid chamber.

10. The boom assembly of claim 9, each of said first and second stage cylinders including a barrel that principally defines the respective fluid chamber, with the barrel of the first stage cylinder being slidably received within the barrel of the second stage cylinder.

11. The boom assembly of claim 10, said second stage cylinder including a tube extending through the second fluid chamber and into the first fluid chamber, said tube presenting a passageway that interconnects the first fluid chamber and a fluid source without communicating with the second fluid chamber.

12. The boom assembly of claim 1, said second stage cylinder including a pressure responsive valve that is in fluid communication with the second fluid chamber to control fluid flow into and out of the second fluid chamber, said pressure responsive valve permitting fluid flow from the second fluid chamber when the fluid pressure within the second fluid chamber exceeds the predetermined level, said pressure responsive valve permitting fluid flow to the second fluid chamber when the fluid pressure within the second fluid chamber is below a predetermined pressure threshold that is lower than the predetermined level.

13. The boom assembly of claim 1, wherein pivoting of the mounting bracket from the desired position is configured to correspond with swinging of the associated boom from an extended position, such that the second stage cylinder serves as a break-away cylinder.

* * * * *